United States Patent
Urakami

(10) Patent No.: US 8,608,322 B2
(45) Date of Patent: Dec. 17, 2013

(54) FOREIGN SUBSTANCE REMOVAL APPARATUS AND OPTICAL APPARATUS INCLUDING THE SAME

(75) Inventor: Toshifumi Urakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 13/421,104

(22) Filed: Mar. 15, 2012

(65) Prior Publication Data

US 2012/0236412 A1 Sep. 20, 2012

(30) Foreign Application Priority Data

Mar. 17, 2011 (JP) ................................. 2011-059219

(51) Int. Cl.
*G02B 1/00* (2006.01)
(52) U.S. Cl.
USPC ........................................................ 359/507
(58) Field of Classification Search
USPC ................... 359/507; 310/366, 322
See application file for complete search history.

(56) References Cited

U.S. PATENT DOCUMENTS

| 7,514,843 | B2 * | 4/2009 | Nagahama et al. ........... 310/317 |
| 2004/0047625 | A1 | 3/2004 | Ito et al. |
| 2009/0015705 | A1 | 1/2009 | Urakami |
| 2010/0246001 | A1 | 9/2010 | Urakami et al. |

FOREIGN PATENT DOCUMENTS

| EP | 2202575 A2 | 6/2010 |
| JP | 2008-207170 A | 9/2008 |
| JP | 2008-211894 A | 9/2008 |

* cited by examiner

*Primary Examiner* — Euncha Cherry
(74) *Attorney, Agent, or Firm* — Canon USA Inc. IP Division

(57) ABSTRACT

A foreign substance removal apparatus detects how large difference is generated between a time phase of a vibration detected when a bending vibration of an m-order vibration mode is excited at an optical low-pass filter 410, and a time phase of a vibration detected when a bending vibration of an (m+1)-order vibration mode is excited at the optical low-pass filter 410. Then, the foreign substance removal apparatus calculates main driving parameters for use in a main driving operation based on the detected time phase difference.

14 Claims, 13 Drawing Sheets

FIG. 2
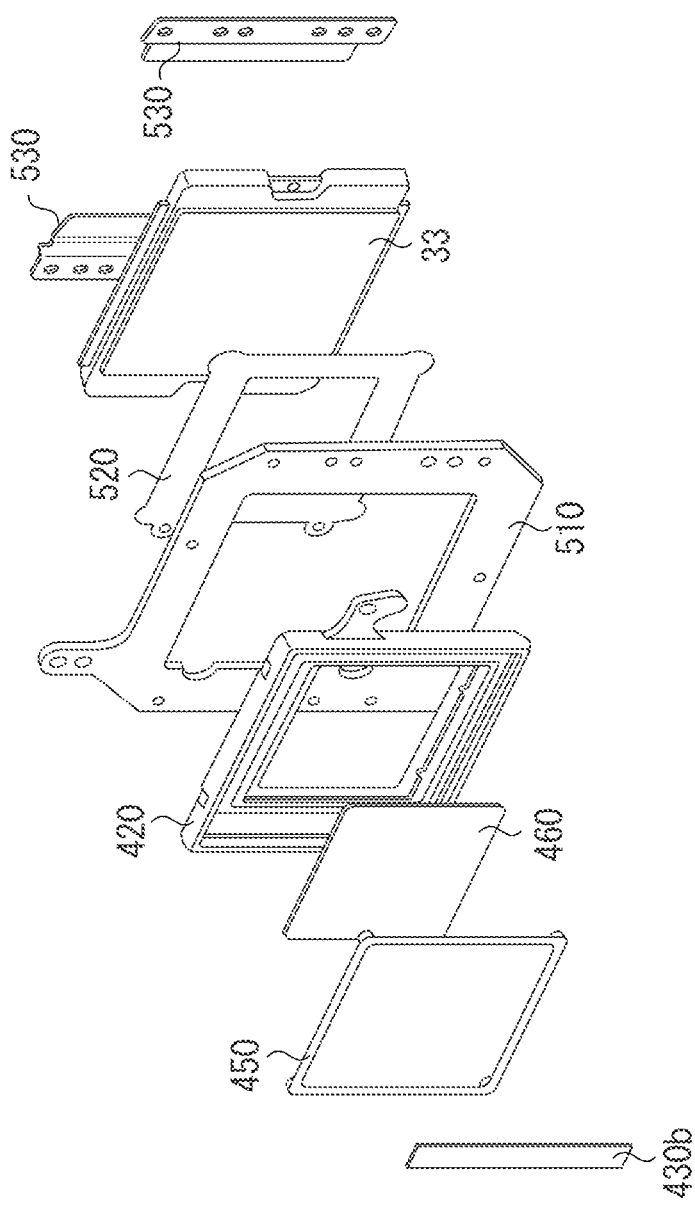
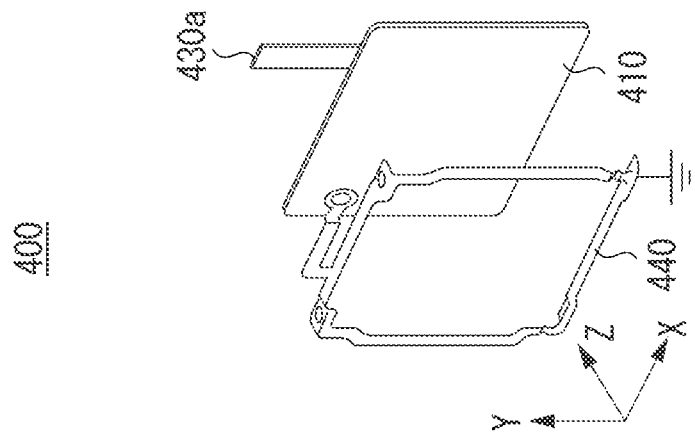

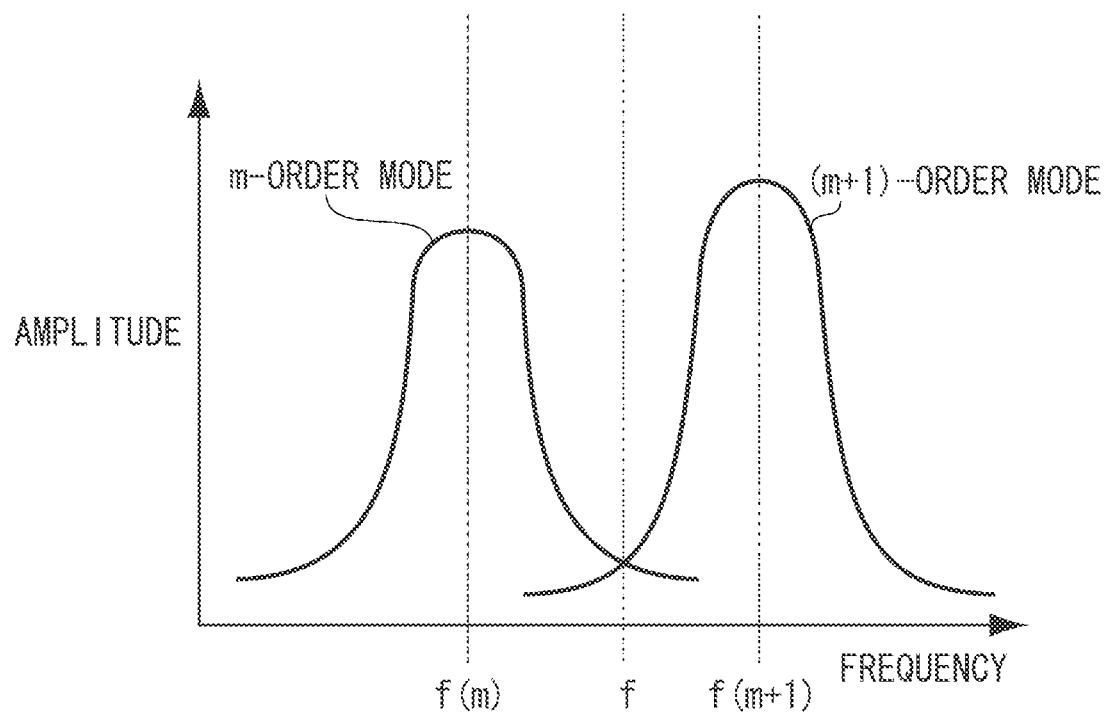

FIG. 4A
IN CASE WHERE
m IS ODD NUMBER (m=9)
SHAPE OF VIBRATION OF FILTER 410
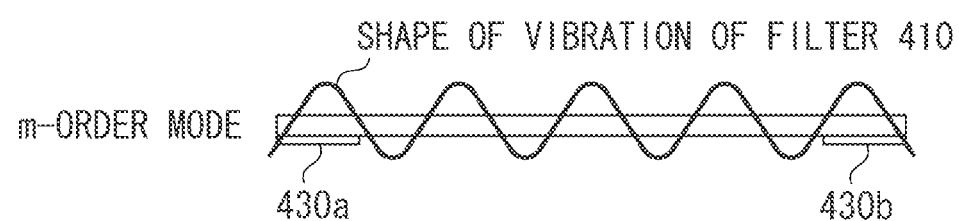
m-ORDER MODE
430a  430b
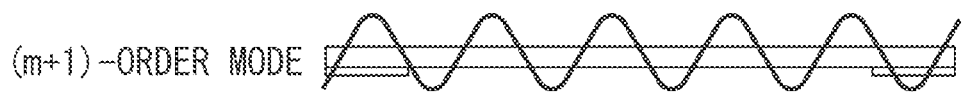
(m+1)-ORDER MODE

FIG. 4B

| | VOLTAGE APPLIED TO PIEZOELECTRIC ELEMENT 430a | | VOLTAGE APPLIED TO PIEZOELECTRIC ELEMENT 430b | |
|---|---|---|---|---|
| | REAL COMPONENT | IMAGINARY COMPONENT | REAL COMPONENT | IMAGINARY COMPONENT |
| (1) m-ORDER | 1 | 0 | 1 | 0 |
| (2) (m+1)-ORDER | A | 0 | −A | 0 |
| (3) (m+1)-ORDER MODE SHIFTED BY 90° IN TERMS OF TIME PHASE | 0 | A | 0 | −A |
| (4) COMBINATION OF (1) AND (3) | 1 | A | 1 | −A |

FIG. 5
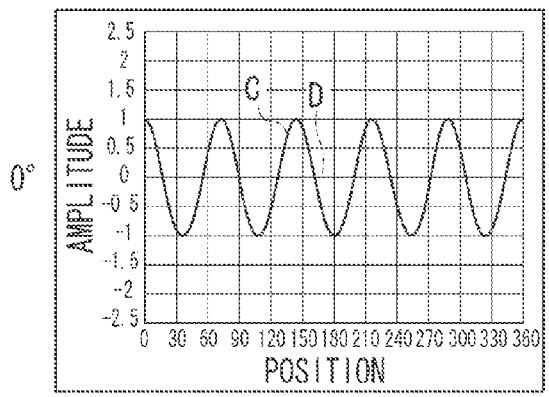
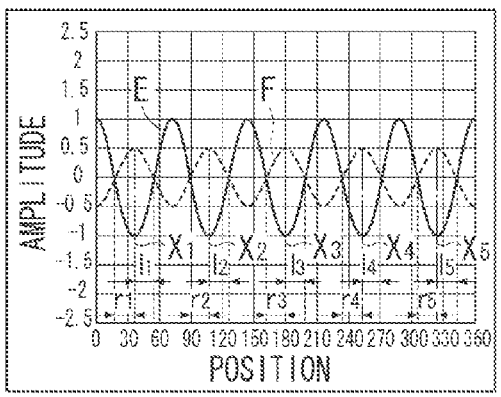
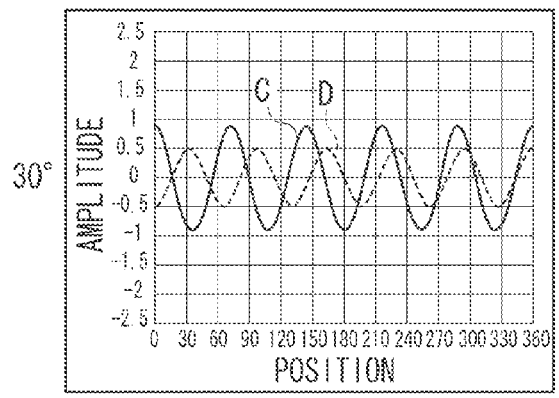
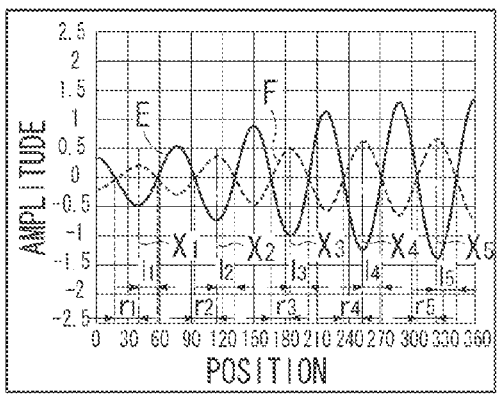
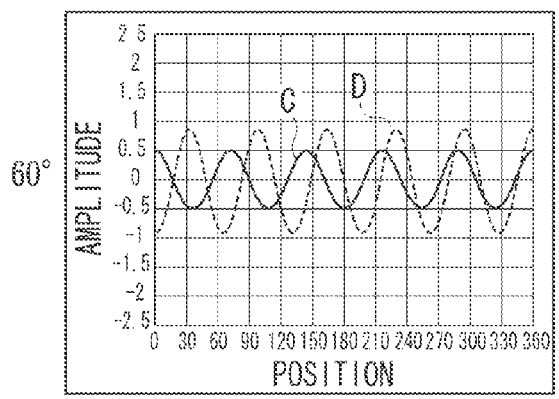
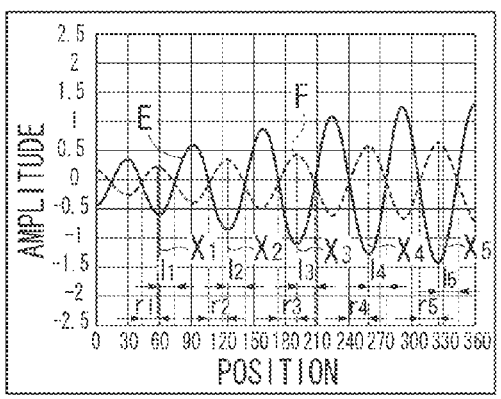

FOREIGN SUBSTANCE REMOVAL APPARATUS AND OPTICAL APPARATUS INCLUDING THE SAME

BACKGROUND OF THE INVENTION

1. Field of the Invention

The present invention relates to a foreign substance removal apparatus capable of eliminating a foreign substance such as dust or dirt, and an optical apparatus including the foreign substance removal apparatus.

2. Description of the Related Art

In optical apparatuses such as digital cameras, the optical apparatus converts an object image into an electric signal to capture the object image, receives an imaging light flux on an image sensor, and converts a photoelectrically converted signal output from the image sensor into image data. Such an imaging apparatus includes an optical low-pass filter and an infrared absorption filter disposed at the object side of the image sensor.

When a foreign substance such as dust or dirt is attached to any of the surfaces of these filters, this results in generation of a black spot in a captured image from the attached portion, thereby deteriorating the visibility of the image.

Especially, in interchangeable lens digital single-lens reflex cameras, mechanically operating units such as a shutter and a quick return mirror are disposed in the vicinity of an image sensor, so that a foreign substance such as dust or dirt produced from these operating units may be attached to the surface of an optical member such as the image sensor and a filter. Further, at the time of a lens exchange, a foreign substance such as dust or dirt may enter from an opening of a lens mount into a camera main body, and may be attached to the surface of an optical member eventually.

To prevent this phenomenon from occurring, it is known to vibrate an optical member disposed at the object side of an image sensor with use of a piezoelectric element to remove a foreign substance such as dust and dirt attached on the surface of the optical member.

Japanese Patent Application Laid-Open No. 2008-207170 discusses a technique of generating a travelling wave at an optical member by simultaneously causing a first bending vibration and a second bending vibration, which has a next higher or lower order than the order of the first bending vibration and is out of time phase with the first bending vibration by 90°, at the optical member.

Even if the first bending vibration and the second bending vibration are excited in such a manner that the second bending vibration is in time phase with the first bending vibration and has a next higher or lower order than the order of the first bending vibration, detection of each of the vibrations reveals that their time phases do not overlap depending on the ambient temperature around the optical member and the provided state of a piezoelectric element.

The driving parameters should be set so that the first bending vibration and the second bending vibration are in time phase difference with each other by an ideal difference to generate a stabilized travelling wave at an optical member.

SUMMARY OF THE INVENTION

According to an aspect of the present invention, a foreign substance removal apparatus includes an optical member, a piezoelectric element provided to the optical member, a drive control unit configured to drive the piezoelectric element in a first driving mode for causing a first bending vibration of the optical member, a second driving mode for causing a second bending vibration of the optical member, and a third driving mode for simultaneously causing the first bending vibration and the second bending vibration. The second bending vibration has an order different from an order of the first bending vibration. The foreign substance removal apparatus further includes a vibration detection unit configured to detect a vibration of the optical member when the drive control unit drives the piezoelectric element in the first driving mode and the second driving mode, and a driving parameter generation unit configured to determine a driving parameter when the drive control unit drives the piezoelectric element in the third driving mode based on a time phase difference between a vibration of the optical member which is detected when the drive control unit drives the piezoelectric element in the first driving mode, and a vibration of the optical member which is detected when the drive control unit drives the piezoelectric element in the second driving mode. The drive control unit drives the piezoelectric element in the third driving mode with use of the driving parameter determined by the driving parameter generation unit.

According to the present invention, it is possible to generate a stabilized travelling wave at the optical member by simultaneously exciting the first bending vibration and the second bending vibration, which has a next higher or lower order than the order of the first bending vibration and is shifted in time phase with the first bending vibration by an ideal difference, at the optical member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is an exploded perspective view schematically illustrating a configuration of an imaging unit 400.

FIG. 3 is a graph illustrating relationships between the frequencies and amplitudes of bending vibrations of two vibration modes excited at an optical low-pass filter 410 according to a first exemplary embodiment.

FIGS. 4A and 4B illustrate shapes of m-order and (m+1)-order vibration modes, and voltages applied to piezoelectric elements 430a and 430b according to the first exemplary embodiment.

FIG. 5 illustrates behavior of the optical low-pass filter 410 when the bending vibrations of the two vibration modes are simultaneously excited.

FIG. 7 illustrates a structure of the piezoelectric element 430a.

FIG. 10 illustrates an output voltage that a vibration detection circuit 112 detects from a sensor electrode SF of the piezoelectric element 430a.

DESCRIPTION OF THE EMBODIMENTS

Various exemplary embodiments, features, and aspects of the invention will be described in detail below with reference to the drawings.

A digital camera will be described as an example of an optical apparatus including a foreign substance removal unit according to an exemplary embodiment of the present invention.

Figure 1:
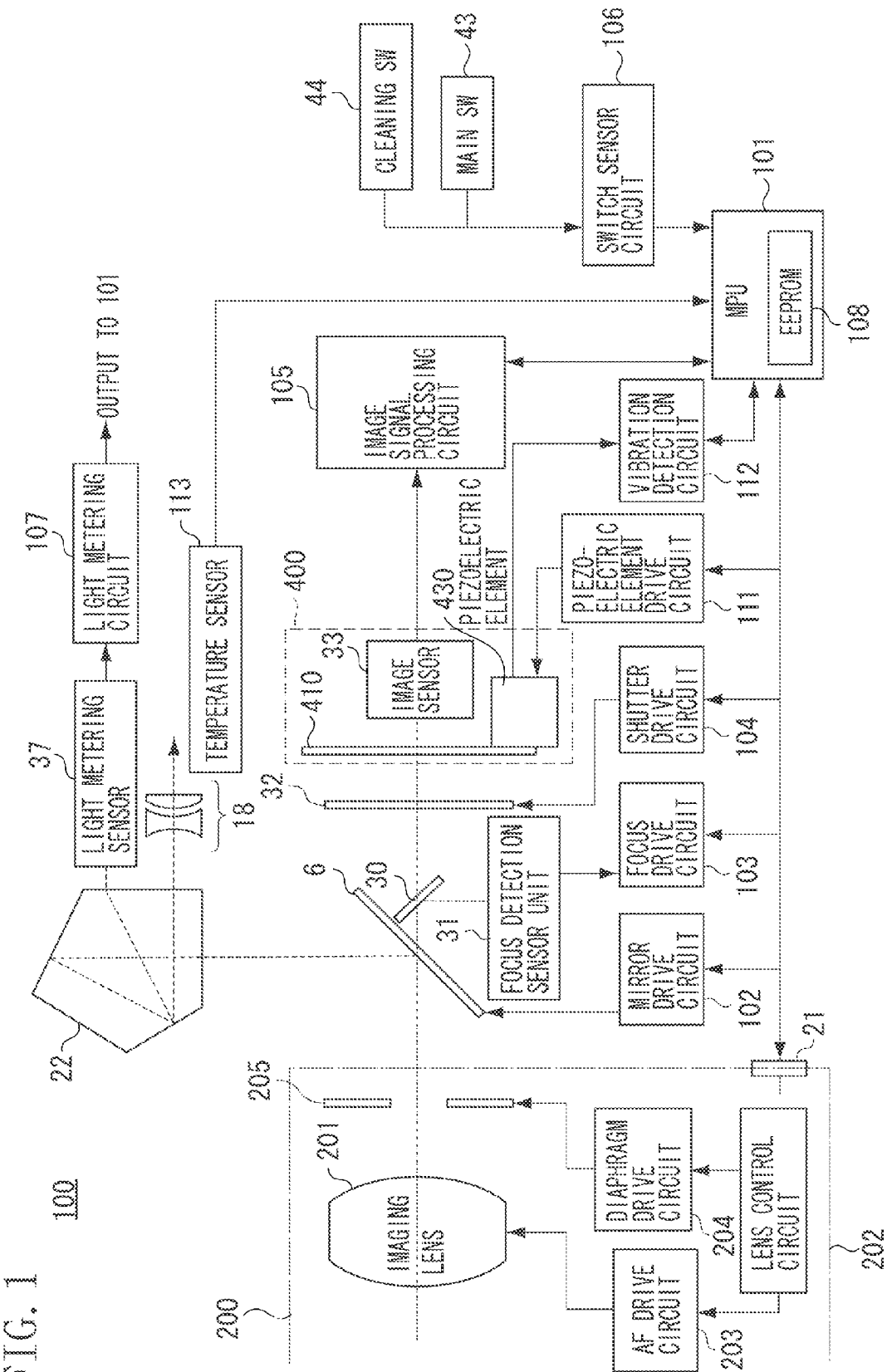
FIG. 1 is a block diagram illustrating a functional configuration of a digital camera 100 according to an exemplary embodiment of the present invention.

FIG. 1 is a block diagram illustrating a functional configuration of a digital camera 100 according to an exemplary embodiment of the present invention.

A micro computer (hereinafter referred to as "micro processing unit (MPU)") 101 is, for example, a central processing unit, and controls the operations of the respective blocks provided in the digital camera 100. Circuits connected to the MPU 101 include a mirror drive circuit 102, a focus drive circuit 103, a shutter drive circuit 104, an image signal processing circuit 105, a switch sensor circuit 106, a light metering circuit 107, a piezoelectric element drive circuit 111, a vibration detection circuit 112, and a temperature sensor 113. These circuits operate under the control of the MPU 101.

The MPU 101 communicates with a lens control circuit 202 in an imaging lens unit 200 via a mount contact 21. The MPU 101 determines that the MPU 101 is now ready for communication with the lens control circuit 202 in the imaging lens unit 200 by receiving a signal via the mount contact 21, when the imaging lens unit 200 is connected to the digital camera 100.

The lens control circuit 202 drives the imaging lens 201 and a diaphragm 205 in the imaging lens unit 200 via an automatic focus (AF) drive circuit 203 and a diaphragm drive circuit 204 by receiving a control signal from the MPU 101. For simplification of illustration, FIG. 1 illustrates the imaging lens 201 as if the imaging lens 201 is constituted by only a single lens, but actually, the imaging lens 201 is constituted by a group of a large number of lenses such as a focus lens.

The AF drive circuit 203 includes, for example, a stepping motor, and focuses an imaging light flux on an image sensor 33 by changing the position of the focus lens in the imaging lens 201 under the control of the lens control circuit 202. The diaphragm drive circuit 204 is, for example, a diaphragm mechanism such as an auto iris, and changes the diaphragm amount of the diaphragm 205 under the control of the lens control circuit 202.

A main mirror 6 guides an imaging light flux transmitted through the imaging lens 201 to a pentagonal prism 22 while allowing a part of the imaging light flux to pass through the main mirror 6 to guide it to a sub mirror 30, in such a state that the main mirror 6 is maintained at an angle of 45° relative to an imaging optical axis illustrated in FIG. 1. The sub mirror 30 guides the imaging light flux transmitted through the main mirror 6 to a focus detection sensor unit 31.

The mirror drive circuit 102 includes, for example, a direct current (DC) motor and a gear train, and drives the main mirror 6 to such a position that the main mirror 6 allows a photographer to observe an object image through a finder, and to such a position that the main mirror 6 is retracted from an imaging light flux. When the main mirror 6 is driven, the sub mirror 30 is simultaneously moved to such a position that the sub mirror 30 guides an imaging light flux to the focus detection sensor unit 31, and to such a position that the sub mirror 30 is retracted from the imaging light flux.

The focus detection sensor unit 31 includes, for example, a field lens, a reflection mirror, a second imaging lens, a diaphragm, and a line sensor including a plurality of charge coupled devices (CCDs), which are disposed in the vicinity of an imaging plane (not illustrated). The focus detection sensor unit 31 performs focus detection according to the phase difference detection method. A signal output from the focus detection sensor unit 31 is supplied to the focus drive circuit 103 to be converted into an object image signal, and then is transmitted to the MPU 101.

The MPU 101 performs focus detection calculation according to the phase difference detection method based on the object image signal. More specifically, the MPU 101 calculates a defocus amount and a focus direction with use of the object image signal, and drives the focus lens in the imaging lens 201 to an in-focus position via the lens control circuit 202 and the AF drive circuit 203 according to the calculated defocus amount and defocus direction.

The pentagonal prism 22 reflects the imaging light flux reflected by the main mirror 6 while converting it into a normal upright image. As a result, a photographer can observe an object image through a finder eyepiece window 18 via a finder optical system.

Further, the pentagonal prism 22 also guides a part of the imaging light flux to a light metering sensor 37. The light metering circuit 107 converts a light metering value output from the light metering sensor 37 into a luminance signal of each area on an observation plane, and then outputs it to the MPU 101. The MPU 101 calculates an exposure value based on the luminance signal.

A shutter unit 32 is, for example, a mechanical focal plane shutter, and is configured so that a shutter first curtain is located at a light shielding position and a shutter second curtain is located at an exposure position when a photographer observes an object image through the finder eyepiece window 18. On the other hand, at the time of shooting, the shutter first curtain performs exposure travelling by moving from the light shielding position to the exposure position, thereby allowing an imaging light flux to pass therethrough. The image sensor 33, which will be described below, photoelectrically converts a formed object image, thereby performing an imaging operation.

Then, after a set exposure time has passed, the shutter second curtain performs light shielding traveling by moving from the exposure position to the light shielding position, thereby completing an imaging operation required to acquire one image data piece. The shutter unit 32 is controlled by the shutter drive circuit 104 that receives a control command from the MPU 101.

The image signal processing circuit 105 applies analog/digital (A/D) conversion processing on an analog image signal output from the image sensor 33, and further, applies various kinds of image processing such as noise removal processing and gain adjustment processing on the thus-acquired digital image data.

The switch sensor circuit 106 transmits to the MPU 101 an input signal input by a photographer's operation of a user interface included in the digital camera 100, such as a main switch (SW) 43 and a cleaning SW 44.

The cleaning SW 44 is a user interface for issuing an instruction to remove a foreign substance such as dust and dirt attached to the surface of an optical low-pass filter 410. A photographer can manually causes a removal operation of a foreign substance on the filter by operating the cleaning SW 44.

An imaging unit 400, which is a foreign substance removal unit, is a block constructed by assembling the members including the optical low-pass filter 410, a piezoelectric element 430, and the image sensor 33 to form one unit. The optical low-pass filter 410 corresponds to an optical member.

The image sensor 33 is, for example, an imaging device such as a complementary metal-oxide semiconductor (CMOS) sensor or CCD sensor. The image sensor 33 outputs an analog image signal by photoelectrically converting a formed optical image of an object, as mentioned above.

The piezoelectric element 430 is, for example, a single-plate piezoelectric element such as a piezo element. The piezoelectric element 430 is configured to be vibrated by a piezoelectric element drive circuit 111 that receives a control signal from the MPU 101, and transmit the vibration to the optical low-pass filter 410.

The MPU 101 and the piezoelectric element drive circuit 111 function as a drive control unit. The vibration detection circuit 112 functions as a vibration detection unit which detects a vibration of the optical low-pass filter 410. The temperature sensor 113 functions as a temperature detection unit which detects a temperature surrounding the optical member.

<Configuration of Foreign Substance Removal Unit>

Now, the imaging unit 400, which is a foreign substance removal unit configured to remove a foreign substance on the filter by vibrating the optical low-pass filter 410, will be described in further detail with reference to FIG. 2. FIG. 2 is an exploded perspective view schematically illustrating the configuration of the imaging unit 400.

The optical low-pass filter 410 disposed in front of the image sensor 33 is a single birefringent plate made of crystal, and has a rectangular shape. The optical low-pass filter 410 is disposed in an optical path, and is a rectangular optical member in which an optical effective area allowing transmittance of a light flux is set.

The optical low-pass filter 410 has a peripheral portion where a pair of piezoelectric elements 430a and 430b is disposed outside the optical effective area, and is symmetrical in the direction perpendicular to the center of the imaging optical axis (i.e., the camera lateral direction). An optical coating such as an infrared cut coating or a reflection prevention coating is applied on the surface of the thus-configured optical low-pass filter 410.

As will be described below, the piezoelectric elements 430a and 430b each include a plurality of electrodes integrally formed on a single piezoelectric member, and have an elongated rectangular contour. The piezoelectric elements 430a and 430b are disposed along the two opposite short sides of the optical low-pass filter 410, respectively.

More specifically, the piezoelectric element 430a is bonded to the optical low-pass filter 410 in such a manner that the long side of the piezoelectric element 430a, which is a first piezoelectric element, extends in parallel with one short side (one end) of the optical low-pass filter 410 at the peripheral portion of the optical low-pass filter 410. On the other hand, the piezoelectric element 430b is bonded to the optical low-pass filter 410 in such a manner that the long side of the piezoelectric element 430b, which is a second piezoelectric element, extends in parallel with the other short side (the other end) of the optical low-pass filter 410 at the peripheral portion of the optical low-pass filter 410.

The optical low-pass filter 410 is vibrated in a wavelike manner with a plurality of anti-nodes and a plurality of nodes generated in parallel with the side of the optical low-pass filter 410. A periodic voltage is applied to the piezoelectric elements 430a and 430b so that the piezoelectric elements 430a and 430b performs contraction/extension movements. These movements then cause the optical low-pass filter 410 to also perform a periodic bending deformation. The state of the vibration will be described concretely below.

An optical low-pass filter holding member 420 is made from a resin or a metal, and serves to hold the optical low-pass filter 410. The optical low-pass filter holding member 420 is fixed to an image sensor holding member 510 with the use of screws.

A biasing member 440 biases the optical low-pass filter 410 toward the image sensor 33. The biasing member 440 is engaged with the optical low-pass filter holding member 420. The biasing member 440 is electrically connected to the portion (ground) of the digital camera 100 that has a ground potential. The surface of the optical low-pass filter 410 is also electrically connected to the portion (ground) of the digital camera 100 that has a ground potential. Due to these connections, it is possible to prevent a foreign substance such as dust and dirt from being electrostatically attached to the surface of the optical low-pass filter 410.

An elastic member 450 has a frame shape substantially circular in cross-section, and is sandwiched by the optical low-pass filter 410 and the optical low-pass filter holding member 420. The biasing member 440 biases the optical low-pass filter 410, which causes the elastic member 450 to be compressed between the optical low-pass filter 410 and the optical low-pass filter holding member 420.

Therefore, the strength of the force for compressing the elastic member 450 is determined based on the biasing force that the biasing member 440 applies toward the image sensor 33. The elastic member 450 may be made of a rubber material or a urethane foam material such as PORON (registered trademark).

An optical member 460 is an optical member constructed by bonding a phase plate (depolarization plate), an infrared cut filter, and a birefringent plate having a different refraction direction from the optical low-pass filter 410 by 90°. The optical member 460 is adhesively fixed to the optical low-pass filter holding member 420.

The image sensor holding member 510 has a rectangular opening formed therethrough, where the image sensor 33 is fixedly held while being maintained in an exposed state. The image sensor holding member 510 is fixed to the main body of the digital camera 100 with, for example, screws.

A mask 520 is held by being sandwiched by the optical low-pass filter holding member 420 and the image sensor 33 to prevent an entry of excess light from the outside of a photographic optical path into the image sensor 33.

Image sensor biasing members 530 are a pair of right and left biasing members constituted by plate springs. The image sensor biasing members 530 are fixed to the image sensor holding member 510 by screws, and press the image sensor 33 against the image sensor holding member 510.

The optical low-pass filter 410 is configured in this way, as a result of which the optical low-pass filter 410 is supported so as to be capable of vibrating while being sandwiched by the biasing member 440 and the elastic member 450.

Next, a vibration occurring at the optical low-pass filter 410 according to the present exemplary embodiment will be described with reference to FIGS. 3 to 6.

In the present exemplary embodiment, a travelling wave moving in the long-side direction (the left-right direction in the drawings) of the optical low-pass filter 410 is generated at the optical low-pass filter 410. More specifically, a traveling wave is generated at the optical low-pass filter 410 by causing two bending vibrations, which are shifted in time phase from each other and have different consecutive order numbers, at the optical low-pass filter 410.

FIG. 3 is a graph illustrating relationships between the frequencies and amplitudes of two vibration modes excited at the optical low-pass filter 410 according to the present exemplary embodiment. As illustrated in FIG. 3, a bending vibration of an m-order vibration mode is excited at a frequency indicated as f(m), and a bending vibration of an (m+1)-order vibration mode is excited at a frequency indicated as f(m+1).

Setting a frequency f of a voltage to be applied to the piezoelectric elements 430a and 430b so as to satisfy the relationship f(m)<f<f(m+1) makes it possible to utilize both the resonance of the bending vibration of the m-order vibration mode and the resonance of the bending vibration of the (m+1)-order vibration mode. If the frequency f is set so as to satisfy the relationship f<f(m), it is possible to utilize the resonance of the m-order vibration mode, but it becomes difficult to utilize the resonance of the (m+1)-order vibration mode, since the frequency is separated away from the resonance point of the (m+1)-order vibration mode in this case.

Further, if the frequency f is set so as to satisfy the relationship f(m+1)<f, it is possible to utilize only the resonance of the (m+1)-order vibration mode. In the present exemplary embodiment, the frequency f is set within the range satisfying the relationship f(m)<f<f(m+1) to utilize the resonance of the both vibration modes.

FIGS. 4A and 4B illustrate waveforms of the m-order and (m+1)-order vibration modes, and voltages applied to the piezoelectric elements 430a and 430b in a case where m is an odd number.

FIGS. 4A and 4B illustrate the waveforms and voltages when m is 9 (m=9), which is one example of m as an odd number. FIG. 4A illustrates the optical low-pass filter 410 as viewed from the main mirror 6 side. The piezoelectric elements 430a and 430b are bonded to the surface, which is closer to the image sensor 33, of the optical low pass filter 410.

As illustrated in FIG. 4A, in each of the bending vibrations of the two vibration modes, a plurality of nodes is generated at regular intervals in the long-side direction of the piezoelectric elements 430a and 430b, in the long-side direction of the optical low-pass filter 410. In FIG. 4B, the amplitudes and time phases of alternating-current voltages applied to the piezoelectric elements 430a and 430b are expressed by real components and imaginary components for each of the bending vibrations of the vibration modes.

The row (1) in the table illustrated in FIG. 4B indicates the alternating-current voltages for the bending vibration of the m-order vibration mode. The row (2) in the table illustrated in FIG. 4B indicates the alternating-current voltages for the (m+1)-order vibration mode. The row (3) in the table illustrated in FIG. 4B indicates the alternating-current voltages for the bending vibration of the (m+1)-order vibration mode shifted by 90° in terms of time phase.

In this table, by setting the amplitude ratio between the bending vibration of the m-order vibration mode and the bending vibration of the (m+1)-order vibration mode to be A:1, the voltage of the bending vibration of each vibration mode is standardized based on the amplitude of the bending vibration of the m-order vibration mode, so that the bending vibrations of the two vibration modes have the same amplitudes.

The bending vibration of the m-order vibration mode and the bending vibration of the (m+1)-order vibration mode, which is shifted in time phase relative to the first bending vibration by 90°, can be simultaneously excited at the optical low-pass filter 410 by adding the alternating-current voltages indicated in the rows (1) and (3) illustrated in FIG. 4B. In other words, the target vibrations can be excited by applying the alternating-current voltages indicated in the row (4) illustrated in FIG. 4B.

Next, a description will be given of behavior of the optical low-pass filter 410 when the bending vibrations of the two vibration modes are simultaneously excited according to the above-described control method. In the present exemplary embodiment, a ninth-order vibration mode and a tenth-order vibration mode are simultaneously excited by way of example.

Figure 6:
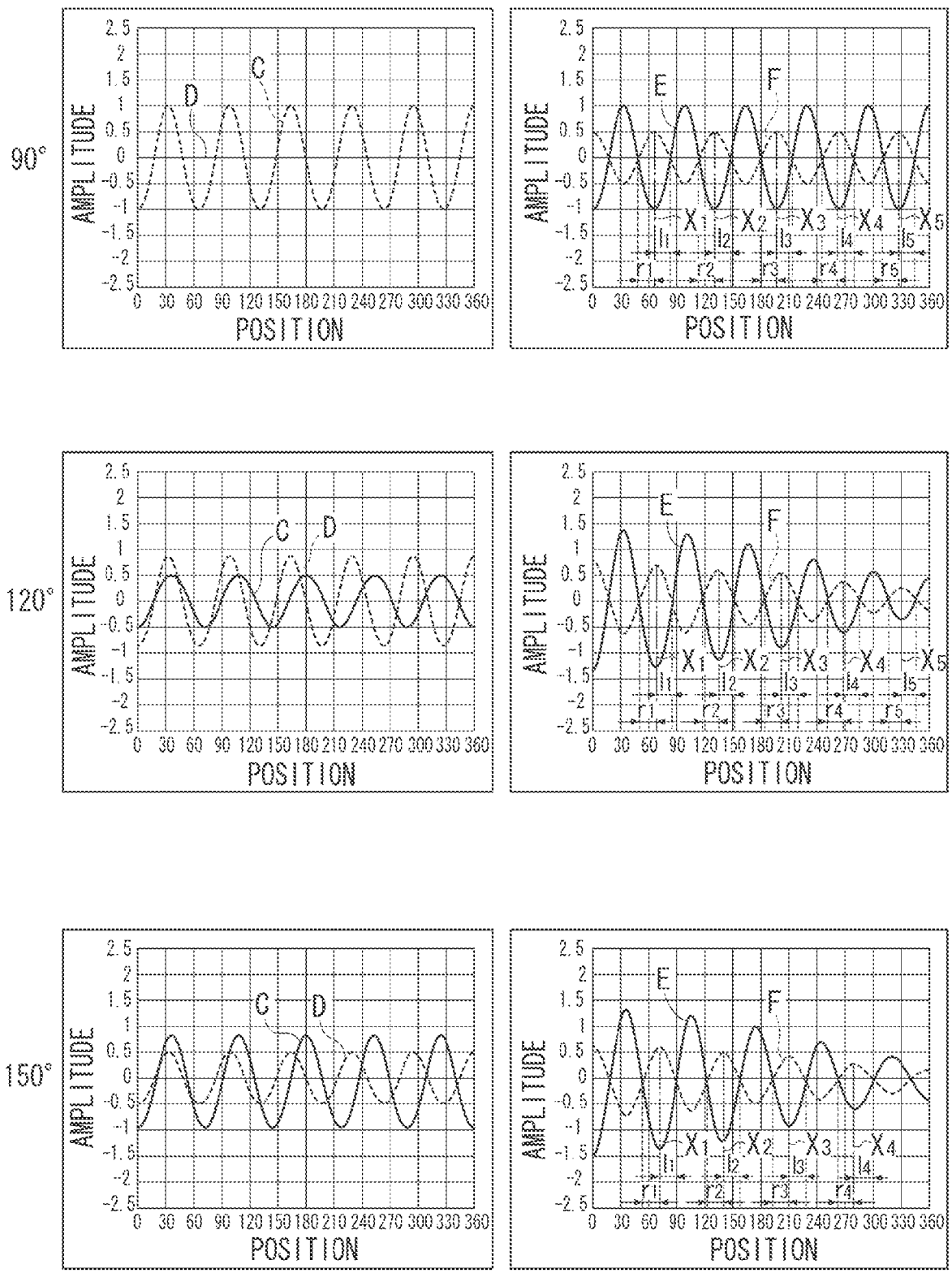
FIG. 6 illustrates behavior of the optical low-pass filter 410 when the bending vibrations of the two vibration modes are simultaneously excited.

FIGS. 5 and 6 illustrate the behavior of the optical low-pass filter 410 in each time phase when the bending vibrations of the two vibration modes are simultaneously excited with their time phases shifted from each other by 90°. The horizontal direction in FIGS. 5 and 6 represents the position in the optical low-pass filter 410, and the positions from the left end to the right end are expressed by the numerical values of 0 to 360. Further, in the description below X indicates the long-side direction of the optical low-pass filter 410, Y indicates the short-side direction of the optical low-pass filter 410, and Z indicates the normal direction of the plane.

In FIGS. 5 and 6, C represents the waveform of the bending vibration of the ninth-order vibration mode, and D represents the waveform of the bending vibration of the tenth-order vibration mode. Further, E represents the synthesized waveform of the two modes.

In other words, E represents the actual amplitude of the optical low-pass filter 410. F represents the acceleration of the optical low-pass filter 410 in the Z direction. A foreign substance attached to the surface of the optical low-pass filter 410 is being conveyed by receiving a force in the normal direction as the optical low-pass filter 410 is deformed.

More specifically, when the curve F, which represents the acceleration in the Z direction, shows a positive value, a foreign substance is thrust up out of the plane, and receives a force in the normal direction of the curve E, which represents a displacement of the optical low-pass filter 410 in this time phase. The foreign substance receives a force in the right direction (the positive direction of the X direction) during the periods indicated by "rn (n=1, 2, 3, . . . )" in FIGS. 5 and 6. The foreign substance receives a force in the left direction (the negative direction of the X direction) during the periods indicated by "ln (n=1, 2, 3, . . . ) in FIGS. 5 and 6.

As a result, the foreign substance is conveyed to the positions indicated by "Xn (n=1, 2, 3, . . . )". In the present exemplary embodiment, as the time phase progresses, the position Xn (n=1, 2, 3, . . . ) is being shifted in the positive direction of the X direction, so that the foreign substance is being conveyed in the positive direction of the X direction.

Figure 7:
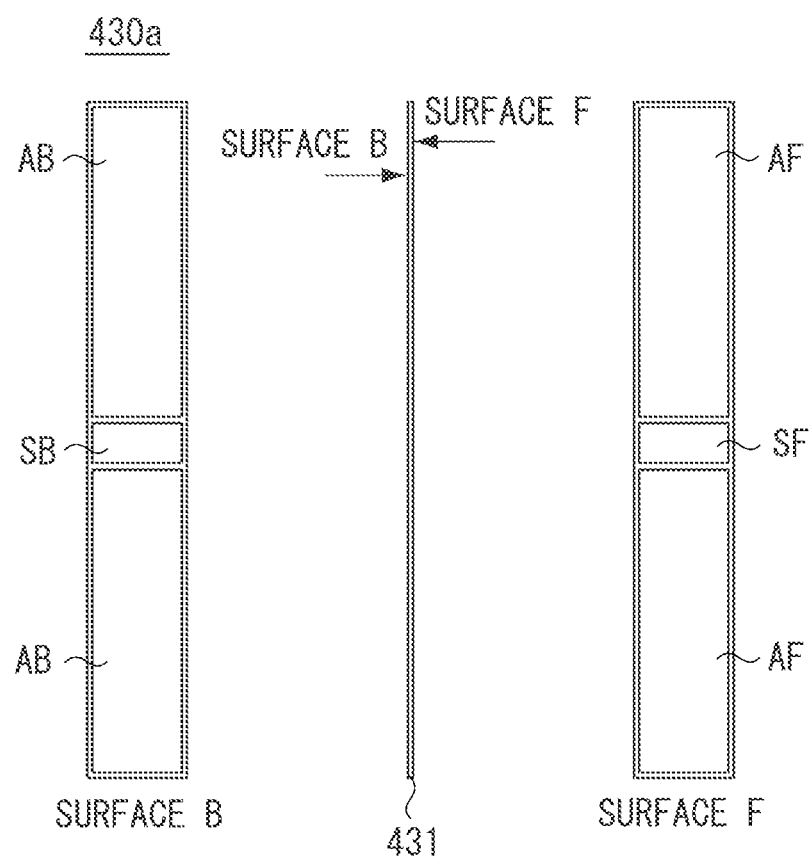

Next, FIG. 7 illustrates the configuration of the piezoelectric element 430a. FIG. 7 is a three-sided drawing of the piezoelectric element 430a. As illustrated in FIG. 7, the piezoelectric element 430a includes a piezoelectric member 431, which is a single piezo element, and four kinds of electrodes formed on the surfaces of the piezoelectric member 431, i.e., a drive electrode AF, a drive electrode AB, a sensor electrode SF, and a ground electrode SB.

As illustrated in FIG. 7, two drive electrodes AF and one sensor electrode SF are formed on a surface F (a first surface) of the piezoelectric member 431. In other words, a plurality of drive electrodes AF is formed on the surface F (the first surface) of the piezoelectric member 431.

Two drive electrodes AB and one ground electrode SB are formed on a surface B (a second surface) of the piezoelectric member 431. The two drive electrodes AF and the two drive electrodes AB are formed at such positions that they have a front-back relationship with respect to the piezoelectric member 431 from each other. The two drive electrodes AF and the two drive electrodes AB are drive electrodes for exciting a vibration at the optical low-pass filter 410.

The piezoelectric element drive circuit 111, which is a control circuit, alternately applies a voltage to the two drive electrodes AF and the two drive electrodes AB, thereby vibrating the optical low-pass filter 410.

The sensor electrode SF is a vibration detection electrode for detecting a vibration of the optical low-pass filter 410. The sensor electrode SF is formed between the two drive electrodes AF on the surface F (the first surface) of the piezoelectric member 431. The sensor electrode SF is connected to the vibration detection circuit 112.

The ground electrode SB is electrically connected to the portion (ground) of the digital camera 100 that has a ground potential. The ground electrode SB is formed between the two drive electrodes AB on the surface B (the second surface) of the piezoelectric member 431. The sensor electrode SF and the ground electrode SB are formed at such positions that they have a front-back relationship with respect to the piezoelectric member 431 from each other.

The vibration detection circuit 112, to which the sensor electrode SF is connected, monitors how an output voltage generated by the sensor electrode SF is changed relative to the ground electrode SB, which has a ground voltage, to detect a vibration of the optical low-pass filter 410.

The drive electrodes AF, the drive electrodes AB, the sensor electrode SF, and the ground electrode SB are connected to a flexible printed circuit board (not illustrated) for the piezoelectric element by thermal compression bonding with use of an anisotropic conductive film (ACF).

The drive electrodes AF and the drive electrodes AB are connected to the piezoelectric element drive circuit 111 via a wiring pattern of the flexible printed circuit board for the piezoelectric element. The sensor electrode SF, which is a vibration detection electrode, is connected to the vibration detection circuit 112 via the wiring pattern of the flexible printed circuit board for the piezoelectric element.

The ground electrode SB is connected to the portion of the digital camera 100, which has a ground potential, via the wiring pattern of the flexible printed circuit board for the piezoelectric element.

The thus-configured piezoelectric element 430a is bonded at the surface F or the surface B thereof to the optical low-pass filter 410 in such a manner that the long side of the piezoelectric element 430a is in parallel with one short side (one side) of the optical low-pass filter 410.

The piezoelectric element 430b is configured in a similar manner to the piezoelectric element 430a. The piezoelectric element 430b is bonded at the surface F or the surface B thereof to the optical low-pass filter 410 in such a manner that the long side of the piezoelectric element 430b is in parallel with the other short side (the other side) of the optical low-pass filter 410.

Next, a description will be given of the positions of the sensor electrodes SF respectively formed on the piezoelectric elements 430a and 430b when the piezoelectric elements 430a and 430b are bonded to the optical low-pass filter 410.

Figure 8:
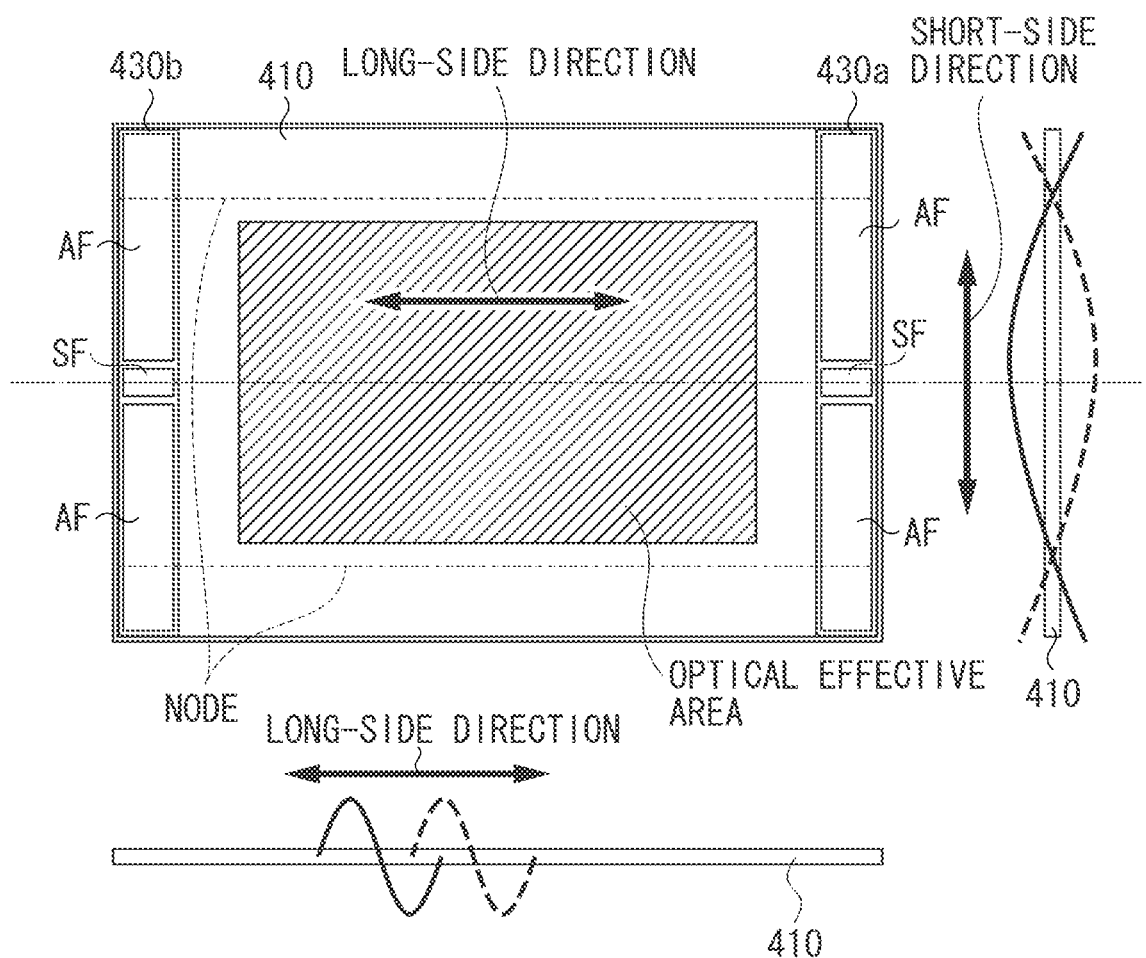
FIG. 8 illustrates the piezoelectric elements 430a and 430b when they are stuck to the optical low pass filter 410 as viewed from the image sensor side, according to the first exemplary embodiment.

FIG. 8 illustrates the piezoelectric elements 430a and 430b with their surfaces B attached to the surface of the optical low-pass filter 410 at the image sensor side, as viewed from the image sensor side.

As illustrated in FIG. 8, the piezoelectric element 430a is bonded to the optical low-pass filter 410 in such a manner that the long side of the piezoelectric element 430a extends along the one short side (the one side) of the optical low-pass filter 410. The length of the long side of the piezoelectric element 430a is approximately equal to the length of one short side (the one side) of the optical low-pass filter 410.

As illustrated in FIG. 8, the piezoelectric element 430b is bonded to the optical low-pass filter 410 in such a manner that the long side of the piezoelectric element 430b extends along the other short side (the other side) of the optical low-pass filter 410. The length of the long side of the piezoelectric element 430b is approximately equal to the length of the short side of the optical low-pass filter 410.

As mentioned above, a foreign substance is conveyed through a vibration of the optical low-pass filter 410 at the frequency f (f(m)<f<f(m+1)). At this time, the frequency f should be a frequency capable of generating a travelling wave most suitable to the conveyance between the frequency f (m) and f(m+1).

FIG. 8 schematically illustrates a traveling wave generated at the frequency f. FIG. 8 illustrates only the optical low-pass filter 410 and the piezoelectric elements 430a and 430b as viewed from the image sensor side with the other members omitted therefrom. Further, the shaded area in FIG. 8 is an optical effective area allowing transmission of an imaging light flux incident on the digital camera 100.

As illustrated in FIG. 8, a traveling wave is generated so as to travel in the long-side direction of the optical low-pass filter 410, i.e., the direction perpendicular to the short-side of the optical low-pass 410 filter to which the piezoelectric elements 430a and 430b are bonded. At this time, a stationary wave of a first-order vibration mode illustrated in FIG. 8 is generated in the short-side direction of the optical low-pass filter 410.

The broken line in FIG. 8 indicates nodes of this first-order stationary wave. This first-order stationary wave has one node in the short-side direction of the optical low-pass filter 410 at each of the opposing sides symmetric about the central axis of the short-side direction of the optical low-pass filter 410. This first-order stationary wave is a stationary wave generated at a frequency between the frequency f(m) (the m-order vibration mode) and the frequency f(m+1) (the (m+1)-order vibration mode).

A foreign substance attached to the surface of the optical low-pass filter 410 is conveyed in the long-side direction of the optical low-pass filter 410 by a synthetic wave of the travelling wave, which travels in the long-side direction of the optical low-pass filter 410, and the first-order stationary wave generated in the short-side direction of the optical low-pass filter 410.

The amplitude of the synthetic wave, which conveys a foreign substance, is maximized at the central axis in the short-side direction of the optical low-pass filter 410, which corresponds to the anti-node of the first-order stationary wave generated in the short-side direction of the optical low-pass filter 410.

The amplitude of the synthetic wave, which conveys a foreign substance, is gradually reduced from the central axis of the short-side direction of the optical low-pass filter 410 toward the node portion of the first-order stationary wave generated in the short-side direction of the optical low-pass filter 410. Then, the amplitude of the synthetic wave, which conveys a foreign substance, is minimized at the node portion of the first-order stationary wave generated in the short-side direction of the optical low-pass filter 410.

Therefore, the amplitude sufficient to convey a foreign substance may not be acquired at the node portion of the first-order stationary wave generated in the short-side direction of the optical low-pass filter 410.

According to the present exemplary embodiment, the size of the optical low-pass filter 410 is optimized to generate the node of the first-order stationary wave outside the optical effective area. In other words, the size of the optical low-pass filter 410 is set so that the node of the first-order stationary wave appears outside the optical effective area.

As a result, it is possible to acquire the amplitude sufficient to convey a foreign substance within the optical effective area of the optical low-pass filter 410.

The travelling wave, which travels in the long-side direction of the optical low-pass filter 410, is reflected at the end of the long side of the optical low-pass filter 410, i.e., the end of the optical low-pass filter 410 where the piezoelectric elements 430a and 430b are not bonded. This results in generation of another vibration different from the first-order stationary wave generated in the short-side direction of the optical low-pass filter 410.

The reflected wave generated at the end of the long-side of the optical low-pass filter 410 interferes with the synthetic wave for conveying a foreign substance. This interference leads to unevenness in the degree of the amplitude of the synthetic wave and generation of a vibration with a phase different from that of the synthetic wave for conveying a foreign substance in the vicinity of the end of the long side of the optical low-pass filter 410.

Therefore, if the sensor electrode SF is located outside relative to the node of the first-order stationary wave generated in the short-side direction of the optical low-pass filter 410, the sensor electrode SF cannot accurately detect the synthetic wave for conveying a foreign substance.

On the other hands, if the sensor electrode SF is located on the node of the first-order stationary wave generated in the short-side direction of the optical low-pass filter 410, it becomes difficult to distinguish the vibration from a noise due to the small amplitude of the synthetic wave for carrying a foreign substance.

For these reasons, the piezoelectric elements 430a and 430b are bonded to the optical low-pass filter 410 so that the sensor electrodes SF thereof are positioned between the nodes of the first-order stationary wave generated in the short-side direction of the optical low-pass filter 410.

In other words, the sensor electrodes SF are positioned between a plurality of nodes of the vibration generated in the short-side direction of the optical low-pass filter 410 to which the piezoelectric elements 430a and 430b are bonded. In the present exemplary embodiment, the sensor electrodes SF are positioned on the central axis of the short-side direction of the optical low-pass filter 410.

This arrangement allows the sensor electrodes SF to detect the synthetic wave having the largest amplitude to thereby easily distinguish the vibration from a noise. Further, the influence of the reflected wave generated at the end of the long-side of the optical low-pass filter 410 is being reduced toward the central axis of the short side of the optical low-pass filter 410, too.

Therefore, positioning the sensor electrodes SF on the central axis of the short side of the optical low-pass filter 410 allows the sensor electrodes SF to accurately detect the traveling wave conveying a foreign substance.

The size of the sensor electrode SF may be any size allowing the sensor electrode SF to produce an output voltage sufficiently larger than a noise level. The drive electrode AF is an electrode for exciting a vibration of the optical low-pass filter 410, so that it may be effective to form the drive electrode AF so as to have a size as large as possible.

The two drive electrodes AF and the two drive electrodes AB formed at the piezoelectric element 430a are referred to as a first drive electrode, and the sensor electrode SF formed at the piezoelectric element 430a is referred to as a first sensor electrode.

Similarly, the two drive electrodes AF and the two drive electrodes AB formed at the piezoelectric element 430b are referred to as a second drive electrode, and the sensor electrode SF formed at the piezoelectric element 430b is referred to as a second sensor electrode.

The piezoelectric element drive circuit 111 is connected to the first drive electrode of the piezoelectric element 430a and the second drive electrode of the piezoelectric element 430b, respectively. A voltage applied from the piezoelectric element drive circuit 111 to the piezoelectric elements 430a and 430b is controlled by the MPU 101.

The vibration detection circuit 112 is connected to the first sensor electrode of the piezoelectric element 430a and the second sensor electrode of the piezoelectric element 430b. An output from the first sensor electrode of piezoelectric element 430a and an output from the second sensor electrode of the piezoelectric element 430b are input into the vibration detection circuit 112.

Figure 9A:
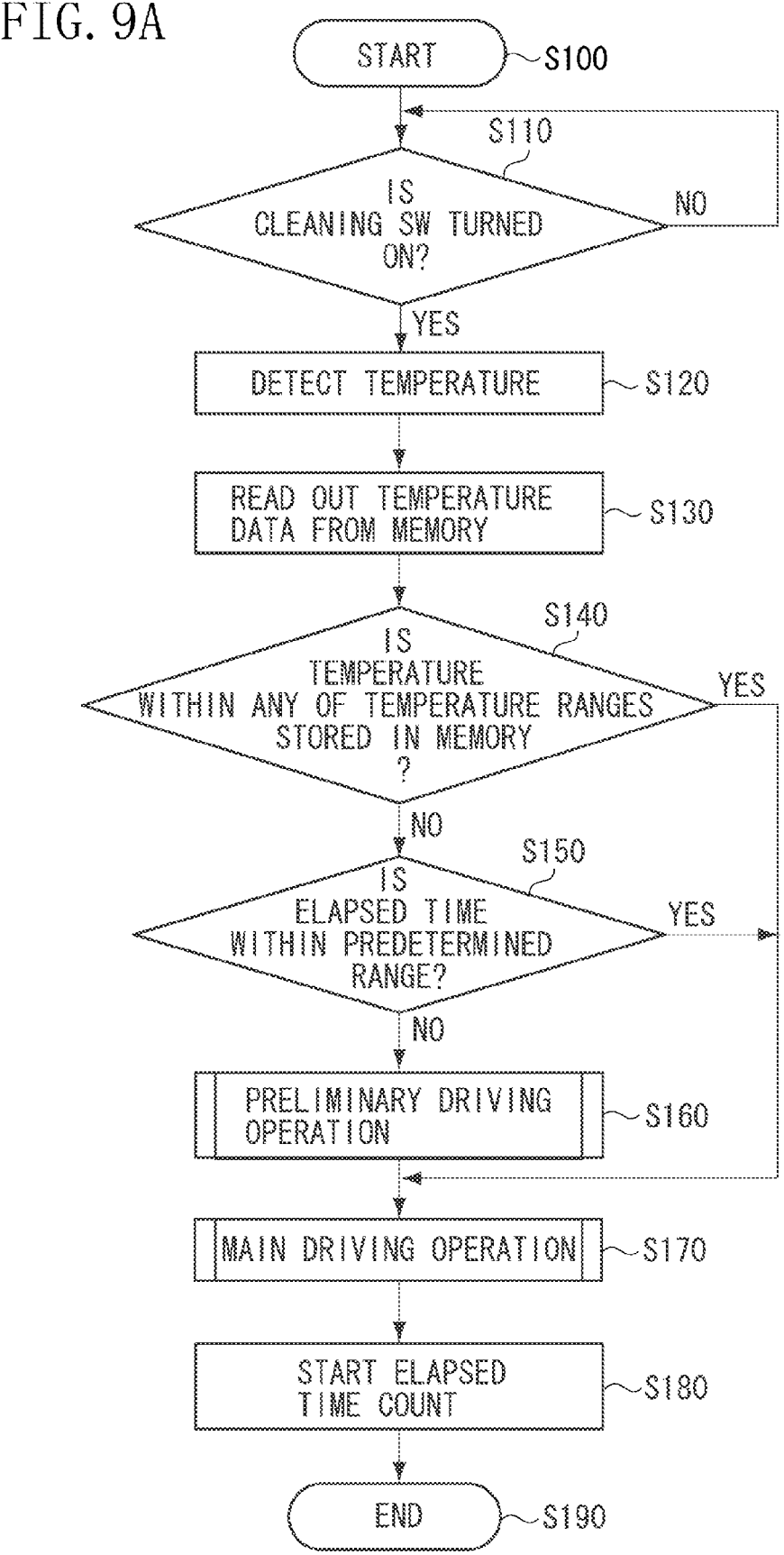
FIGS. 9A, 9B, and 9C are flowcharts illustrating a foreign substance removal operation.

The foreign substance removal operation according to the present exemplary embodiment will be described with reference to FIGS. 9A to 9C. FIG. 9A is a main flowchart of the foreign substance removal operation according to the present exemplary embodiment.

In step S100, the main flow of the foreign substance removal operation is started.

In step S110, the switch sensor circuit 106 detects a turning-on operation of the cleaning SW 44. In step S120, the MPU 101 detects the internal temperature of the digital camera 100 based on an output from the temperatures sensor 113.

In step S130, the MPU 101 reads out the temperature data stored in an electrically erasable programmable read-only memory (EERPOM) 108. The EEPROM 108 stores data in which main driving parameters calculated based on previous preliminary driving operations and the temperature data at the time of execution of the preliminary driving operations are associated with each other.

In step S140, the MPU 101 determines whether the internal temperature of the digital camera 100 detected in step S120 is within any of predetermined temperature ranges set based on the temperatures stored in the EEPROM 108. If the internal temperature of the digital camera 100 is within any of the temperature ranges (YES in step S140), the processing proceeds to step S170. If the internal temperature of the digital camera 100 is not within any of the temperature ranges (NO in step S140), the processing proceeds to step S150.

In step S150, the MPU 101 determines whether the elapsed time after execution of the foreign substance removal operation is within a predetermined time range set in advance. If the elapsed time after execution of the foreign substance removal operation is within the predetermined time range (YES in step S150), the processing proceeds to step S170. If the elapsed time from execution of the foreign substance removal operation is not within the predetermined time range (NO in step S150), the processing proceeds to step S160.

In step S160, the MPU 101 executes a preliminary driving operation. The details of the preliminary driving operation will be described below.

In step S170, the MPU 101 executes a main driving operation. The details of the main driving operation will be described below.

In step S180, the MPU 101 starts a time count. As a result, it is possible to measure the elapsed time since the foreign substance removal operation is performed. In other words, the MPU 101 functions as a time counter unit for measuring the elapsed time since the piezoelectric element is driven.

Then, in step S190, the main flow of the foreign substance removal operation is ended.

Figure 9B:
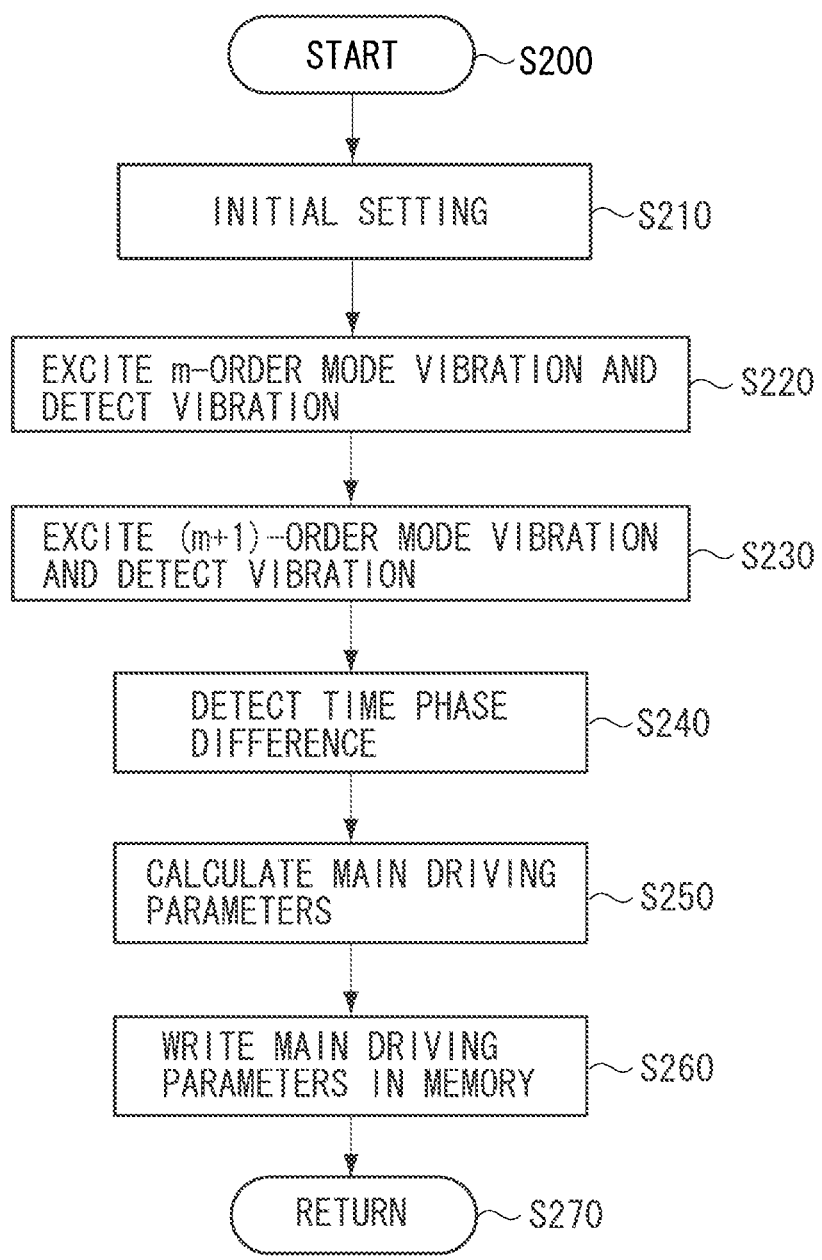

FIG. 9B is a sub flowchart illustrating the details of the preliminary driving operation illustrated in step S160 according to the present exemplary embodiment.

It is necessary to simultaneously excite the bending vibration of the m-order vibration mode and the bending vibration of the (m+1)-order vibration mode, which is shifted in time phase relative to the bending vibration of the m-order vibration mode by 90°, at the optical low-pass filter 410 to generate a travelling wave at the optical low-pass filter 410.

Therefore, it is necessary to detect how large a difference in time phase is generated between when the optical low-pass filter 410 has the bending vibration of the m-order vibration mode and when the optical low-pass filter 410 has the bending vibration of the (m+1)-order vibration mode with the same time phase as the m-order vibration.

Then, it is desirable to determine the amount of the time phase difference of the bending vibration of the (m+1)-order vibration mode from the bending vibration of the m-order vibration mode in consideration of the detected time phase difference.

For example, if the detected time phase difference is 10° between the bending vibration of the m-order vibration mode and the bending vibration of the (m+1)-order vibration mode, it is determined that the bending vibration of the (m+1)-order vibration mode is shifted in time phase from the bending vibration of the m-order vibration mode by 80°.

This setting makes it possible to simultaneously excite the bending vibration of the m-order vibration mode, and the bending vibration of the (m+1)-order vibration mode, which is shifted in time phase relative to the bending vibration of the m-order vibration mode by 90°, at the optical low-pass filter 410. As a result, it becomes possible to generate a stabilized travelling wave at the optical low-pass filter 410.

In the preliminary driving operation, first, a vibration is detected by the vibration detection circuit 112 when the bending vibration of the m-order vibration mode is excited at the optical low-pass filter 410. The bending vibration of the m-order vibration mode here corresponds to a first bending vibration, and exciting the bending vibration of the m-order vibration mode at the optical low-pass filter 410 corresponds to a first driving mode.

Subsequently, a vibration is detected by the vibration detection circuit 112 when the bending vibration of the (m+1)-order vibration mode in the same time phase with the m-order vibration mode is excited at the optical low-pass filter 410.

The bending vibration of the (m+1)-order vibration mode here, which is in the same time phase with the bending vibration of the m-order vibration mode, corresponds to a second bending vibration, and exciting the bending vibration of the (m+1)-order vibration mode in the same time phase with the m-order vibration mode corresponds to a second driving mode.

After that, it is detected how large a difference is generated between the time phase of the vibration detected when the bending vibration of the m-order vibration mode is excited at the optical low-pass filter 410, and the time phase of the vibration detected when the bending vibration of the (m+1)-order vibration mode is excited at the optical low-pass filter 410.

Then, the MPU 101 generates driving parameters for use in the main driving operation based on the detected time phase difference. The MPU 101 functions as a driving parameter generation unit.

The MPU 101 stores the data in which the generated driving parameters, the temperature range set based on the internal temperature of the digital camera 100, and the date and time when the driving parameters are generated in the EEPROM 108, are associated. The EEPROM 108 corresponds to a memory storing an operation parameter.

Execution of the preliminary driving operation allows a calculation of the driving parameters for simultaneously exciting the bending vibration of the m-order vibration mode and the bending vibration of the (m+1)-order vibration mode, which is shifted in time phase relative to the bending vibration of the m-order vibration mode by exactly 90°, at the optical low-pass filter 410.

In step S200, the sub flow of the preliminary driving operation is started.

In step S210, the piezoelectric element drive circuit 111 sets the frequency f, the voltage, and the power supply time for power application to the piezoelectric elements 430a and 430b.

The frequency f for use in the preliminary driving operation is the same frequency as the frequency f for use in the main driving operation. The value of this frequency f is different for each imaging unit 400 due to, for example, a variety in the thicknesses of the optical low-pass filters 410 and a difference in the ambient temperatures. This frequency f can be recognized by, for example, measuring the resonance frequency of the optical low-pass filter 410 with use of, for example, an impedance analyzer.

During the preliminary driving operation, it is sufficient to vibrate the optical low-pass filter 410 with amplitude just allowing the vibration detection circuit 112 to detect the vibration.

In the present exemplary embodiment, in consideration of this fact, a first voltage, which is applied to the piezoelectric elements 430a and 430b during the preliminary driving operation, is set so as to be a lower voltage than a second voltage, which is applied to the piezoelectric elements 430a and 403b during the main driving operation.

Further, it is sufficient to vibrate the optical low-pass filter 410 for a time just allowing the vibration detection circuit 112 to detect the vibration as the driving time of the piezoelectric elements 430a and 430b.

Therefore, a first driving time, for which the piezoelectric elements 430a and 430b are driven as one operation during the preliminary driving operation, is set so as to be a shorter driving time than a second driving time, for which the piezoelectric elements 430a and 430b are driven as one operation during the main driving operation.

In the present exemplary embodiment, the voltage applied to the piezoelectric elements 430a and 430b by the piezoelectric element drive circuit 111 is set to be 40 V, and the power supply time is set to be 20 ms.

As a result, it is possible to reduce power consumption of the digital camera 100, which is another advantageous effect of the present exemplary embodiment.

In step S220, the piezoelectric element drive circuit 111 drives the piezoelectric elements 430a and 430b according to the frequency f, the voltage, and the power supply time set in step S210 to excite the bending vibration of the m-order vibration mode at the optical low-pass filter 410.

The vibration of the optical low-pass filter 410 is accompanied by generation of a voltage having a sine wave of the frequency f at the sensor electrodes SF of the piezoelectric elements 430a and 430b due to the piezoelectric effect. At this time, the ground electrodes SB of the piezoelectric elements 430a and 430b are constantly maintained at the ground potential (0 V), so that the vibration detection circuit 112 detects output voltages from the respective piezoelectric elements 430a and 430b.

In the example illustrated in FIGS. 4A and 4B, driving voltages in the same phase are applied to the piezoelectric elements 430a and 430b to excite the bending vibration of the m-order vibration mode. Therefore, the output voltage that the vibration detection circuit 112 detects from the sensor electrode SF of the piezoelectric element 430a, and the output voltage that the vibration detection circuit 112 detects from the sensor electrode SF of the piezoelectric element 430b show the same sine waveforms.

In step S230, the piezoelectric element drive circuit 111 drives the piezoelectric elements 430a and 430b according to the frequency f, the voltage, and the power supply time set in step S210 to excite the bending vibration of the (m+1)-order vibration mode at the optical low-pass filter 410.

The vibration of the optical low-pass filter 410 is accompanied by generation of a voltage having a sine wave of the frequency f at the sensor electrodes SF of the piezoelectric elements 430a and 430b due to the piezoelectric effect. At this time, the ground electrodes SB of the piezoelectric elements 430a and 430b are constantly maintained at the ground potential (0 V), so that the vibration detection circuit 112 can detect output voltages from the respective piezoelectric elements 430a and 430b.

In the example illustrated in FIG. 4, a voltage in the same phase with the voltage applied when the bending vibration of the m-order vibration mode is excited is applied to the piezoelectric elements 430a to excite the bending vibration of the (m+1)-order vibration mode. However, in this case, a voltage shifted in phase by 180° relative to the voltage applied when the bending vibration of the m-order vibration mode is excited is applied to the piezoelectric element 430b.

Therefore, the output voltage that the vibration detection circuit 112 detects from the sensor electrode SF of the piezoelectric element 430b shows a reversed sine waveform with respect to the output voltage that the vibration detection circuit 112 detects from the sensor electrode SF of the piezoelectric element 430a.

In the present exemplary embodiment, the vibration is detected based on the output voltage from the sensor electrode SF of the piezoelectric element 430a, to which the voltages in the same phase are applied when the bending vibration of the m-order vibration mode is excited and when the bending vibration of the (m+1)-order vibration mode is excited.

In step S240, a difference is detected between the time phase of the vibration detected when the bending vibration of the m-order vibration mode is excited at the optical low-pass filter 410, and the time phase of the vibration detected when the bending vibration of the (m+1)-order vibration mode is excited at the optical low-pass filter 410.

Figure 10:
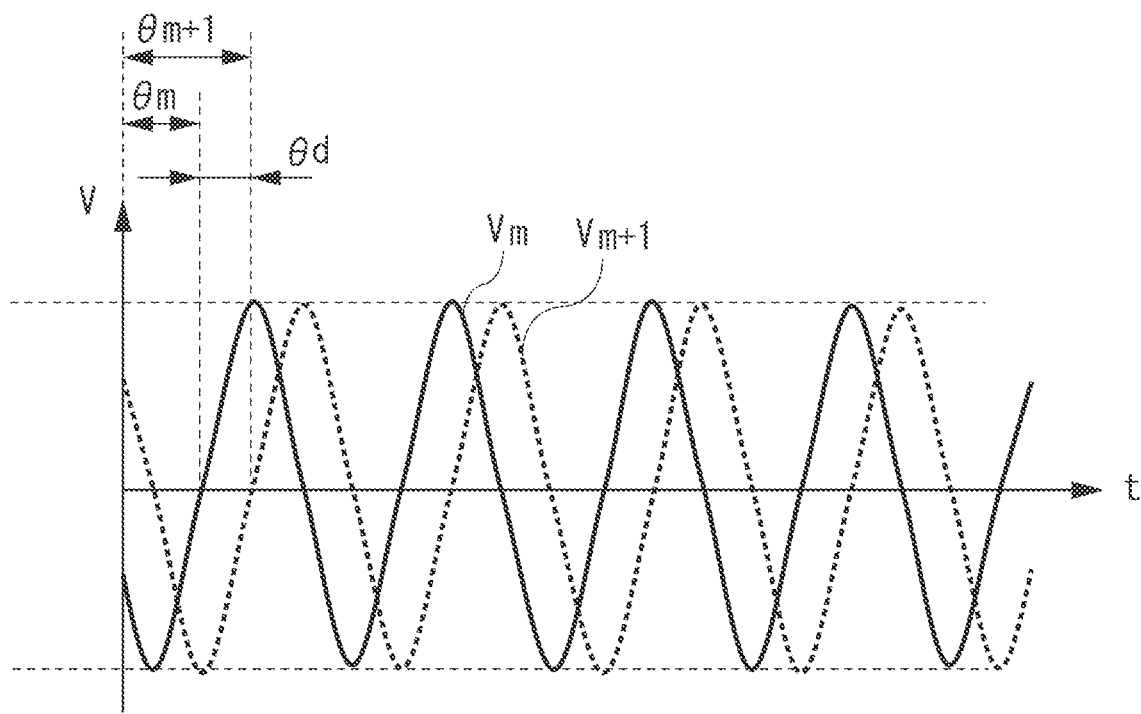

FIG. 10 illustrates the output voltages that the vibration detection circuit 112 detects from the sensor electrode SF of the piezoelectric element 430a. In FIG. 10, the vertical axis represents the voltage, and the horizontal axis represents the time. The voltage represented by the vertical axis is proportional to the amplitude of the optical low-pass filter 410.

In FIG. 10, a sine waveform Vm indicated by the solid line is an output voltage that the vibration detection circuit 112 detects from the sensor electrode SF of the piezoelectric element 430a when the bending vibration of the m-order vibration mode is excited at the optical low-pass filter 410.

A phase θm in FIG. 10 indicates a time from a start of driving the piezoelectric element 430a to excite the bending vibration of the m-order vibration mode at the optical low-pass filter 410 to detection of the vibration of the optical low-pass filter 410 by the vibration detection circuit 112.

In FIG. 10, a sine waveform Vm+1 indicated by the broken line is an output voltage that the vibration detection circuit 112 detects from the sensor electrode SF of the piezoelectric element 430a when the bending vibration of the (m+1)-order vibration mode is excited at the optical low-pass filter 410.

A phase θm+1 in FIG. 10 indicates a time from a start of driving the piezoelectric element 430a to excite the bending vibration of the (m+1)-order vibration mode at the optical low-pass filter 410 to detection of the vibration of the optical low-pass filter 410 by the vibration detection circuit 112.

Then, θd in FIG. 10 corresponds to a time phase difference between the vibration detected when the bending vibration of the m-order vibration mode is excited at the optical low-pass filter 410 and the vibration detected when the bending vibration of the (m+1)-order vibration mode is excited at the optical low-pass filter 410.

A voltage applied to the piezoelectric element 430a to excite the bending vibration of the m-order vibration mode is in the same phase with a voltage applied to the piezoelectric element 430a to excite the bending vibration of the (m+1)-order vibration mode. Therefore, in the present exemplary embodiment, the above-described time phase difference is calculated with use of the output voltages detected from the sensor electrode SF of the piezoelectric element 430a, to which voltages in the same phase are applied when the bending vibration of the m-order vibration mode is excited and when the bending vibration of the (m+1)-order vibration mode is excited.

In step S250, the MPU 101 calculates the time phase of the bending vibration of the (m+1)-order vibration mode relative to that of the bending vibration of the m-order vibration mode, based on the time phase difference θd detected in step S240.

Then, the MPU 101 performs a vector operation to calculate the driving parameters for the main driving operation to simultaneously excite the bending vibration of the m-order vibration mode and the bending vibration of the (m+1)-order vibration mode, which is shifted in time phase relative to the bending vibration of the m-order vibration mode by the calculated degree, at the optical low-pass filter 410.

For example, in a case where the bending vibration of the (m+1)-order vibration mode is delayed relative to the bending vibration of the m-order vibration mode by 10° (the time phase difference θd is 10°), the MPU 101 sets the time phase of the (m+1)-order vibration mode so as to be delayed relative to the time phase of the m-order vibration mode by 80°.

Then, the MPU 101 performs a vector operation to synthesize the parameters for exciting the bending vibration of the m-order vibration mode at the optical low-pass filter 410, and the parameters for exciting the bending vibration of the (m+1)-order vibration mode, which is shifted in time phase relative to the bending vibration of the m-order vibration mode by 80°, at the optical low-pass filter 410. The driving parameters synthesized by the vector operation are used as the driving parameters for the main driving operation.

The driving parameters calculated here are a voltage to be applied to the piezoelectric element 430a, a voltage to be applied to the piezoelectric element 430b, and a phase difference of the voltage to be applied to the piezoelectric element 430b from the voltage to be applied to the piezoelectric element 430a.

In step S260, the MPU 101 stores the driving parameters for the main driving operation calculated in step S250 in the EEPROM 108. The driving parameters are associated with the temperature range set based on the temperature data detected in step S120, and the date and time when the driving parameters for the main driving operation are generated.

In step S270, the sub flow of the preliminary driving operation is ended, and the processing returns to the main flow.

Figure 9C:
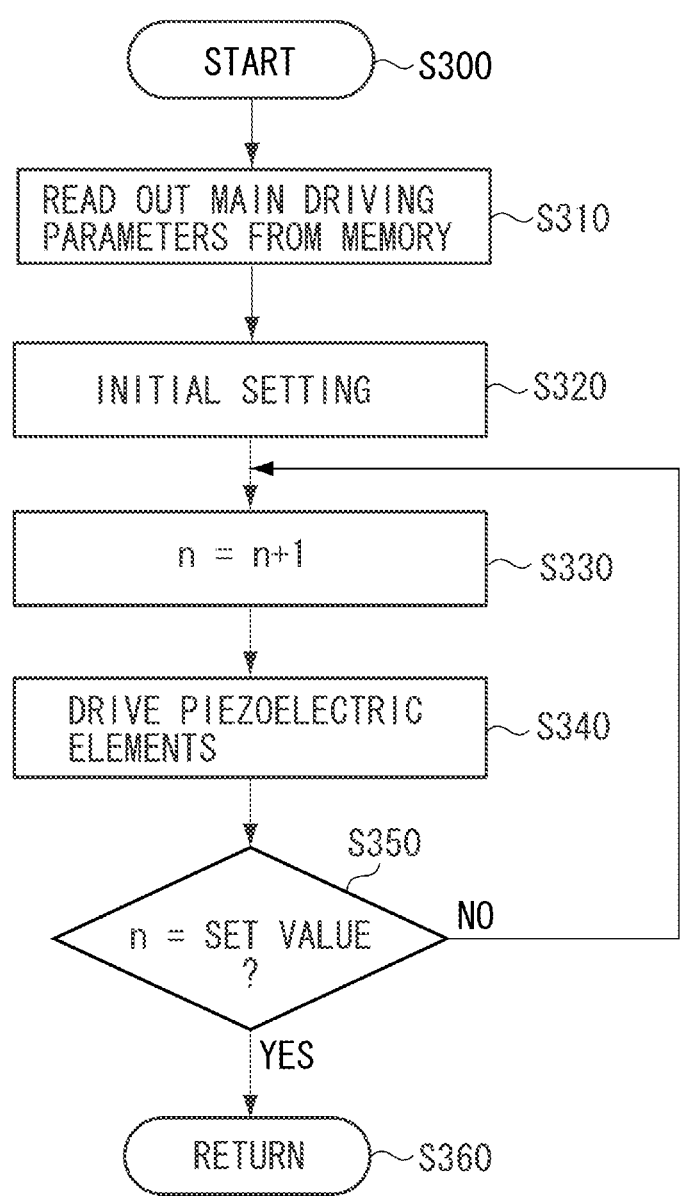

FIG. 9C is a sub flowchart illustrating the details of the main driving operation illustrated in step S170 according to the present exemplary embodiment.

In step S300, the sub flow of the main driving operation is started.

In step S310, the MPU 101 reads out appropriate driving parameters for the main driving operation from the EEPROM 108.

More specifically, if the temperature detected in step S120 falls within any of the temperature ranges stored in the EEPROM 108, the MPU 101 reads out the driving parameters for the main driving operation that are associated with the temperature range within which the temperature detected in step S120 falls. If the temperature detected in step S120 does not fall within any of the temperature ranges stored in the EEPROM 108, the MPU 101 reads out the driving parameters having the latest date and time as the date and time when the driving parameters for the main driving operation were generated.

In step S320, the MPU 101 sets the driving parameters for the main driving operation, which are read out in step S310, and also sets the frequency f, the voltage v, the phase difference, and the power supply time for power application from the piezoelectric element drive circuit 111 to the piezoelectric elements 430a and 430b. In the present exemplary embodiment, for example, the MPU 101 sets 120 V, 100 V, and 500 ms as the voltage that the piezoelectric element drive circuit 111 applies to the piezoelectric element 430a, the voltage that the piezoelectric element drive circuit 111 applies to the piezoelectric element 430b, and the power supply time therefor, respectively.

During the main driving operation, increasing voltages to be applied to the piezoelectric elements 430a and 430b, and applying such voltages for a long power supply time lead to an increase in the possibility of succeeding in removing a foreign substance attached to the optical low-pass filter 410, so that maximally increased voltages are applied to the piezoelectric elements 430a and 430b.

In step S330, the MPU 101 increments a repetition count n of the main driving operation.

In step S340, the piezoelectric element drive circuit 111 drives the piezoelectric elements 430a and 430b according to the conditions set in step S320.

This driving results in simultaneous occurrence of the bending vibration of the m-order vibration mode and the bending vibration of the (m+1)-order vibration, which is shifted in time phase relative to the bending vibration of the m-order vibration mode by the calculated degree, at the optical low-pass filter 410. This operation corresponds to a third driving mode of simultaneously exciting the first bending vibration and the second bending vibration, which is out of time phase with the first bending vibration and has a next higher or lower order than the order of the first bending vibration.

In step S350, the MPU 101 determines whether the repetition count n of the main driving operation reaches a preset value. If the repetition count n of the main driving operation reaches the preset value (YES in step S350), the processing proceeds to step S360. If the repetition count n of the main driving operation does not reach the preset value (NO in step S350), the processing proceeds to step S330.

In step S360, the sub flow of the main driving operation is ended, and the processing returns to the main flow.

According to the present exemplary embodiment, it is possible to simultaneously excite the bending vibration of the m-order vibration mode and the bending vibration of the (m+1)-order vibration mode, which is shifted in time phase relative to the bending vibration of the m-order vibration mode by exactly 90°, at the optical low-pass filter 410. As a result, it is possible to generate a stabilized travelling wave at the optical low-pass filter 410. Further, it is possible to reduce power consumption at the time of the preliminary driving operation, even if the highest possible voltage is set as the voltage to be applied to the piezoelectric elements 430a and 430b to maximally exert the foreign substance removal ability at the time of the main driving operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-059219 filed Mar. 17, 2011, which is hereby incorporated by reference herein in its entirety.

What is claimed is:

1. A foreign substance removal apparatus comprising:
    an optical member;
    a piezoelectric element attached to the optical member;
    a drive control unit configured to drive the piezoelectric element in a first driving mode for exciting a first bending vibration of the optical member, a second driving mode for exciting a second bending vibration of the optical member, and a third driving mode for simultaneously exciting the first bending vibration and the second bending vibration, the second bending vibration having an order different from an order of the first bending vibration;
    a vibration detection unit configured to detect a vibration of the optical member when the drive control unit drives the piezoelectric element in the first driving mode and the second driving mode; and
    a driving parameter generation unit configured to determine a driving parameter for when the drive control unit drives the piezoelectric element in the third driving mode based on a time phase difference between a vibration of the optical member which is detected when the drive control unit drives the piezoelectric element in the first driving mode, and a vibration of the optical member which is detected when the drive control unit drives the piezoelectric element in the second driving mode,
    wherein the drive control unit is configured to drive the piezoelectric element in the third driving mode with use of the driving parameter determined by the driving parameter generation unit.

2. The foreign substance removal apparatus according to claim 1,
    wherein a drive electrode and a sensor electrode are formed at the piezoelectric element,
    wherein the drive control unit is configured to drive the piezoelectric element by applying a voltage to the drive electrode, and
    wherein the vibration detection unit is configured to detect the vibration of the optical member from an output from the sensor electrode.

3. The foreign substance removal apparatus according to claim 2,
    wherein the piezoelectric element includes a first piezoelectric element provided at one end of the optical member, and a second piezoelectric element provided at the other end of the optical member, wherein a first drive electrode and a first sensor electrode are formed at the first piezoelectric element, wherein a second drive electrode is formed at the second piezoelectric element, wherein the drive control unit is configured to apply voltages in a same phase to the first drive electrode and the second drive electrode, both when the drive control unit drives the first piezoelectric element and the second piezoelectric element in the first driving mode and when the drive control unit drives the first piezoelectric element and the second piezoelectric element in the second driving mode, and wherein the vibration detection unit is configured to detect the vibration of the optical member from an output of the first sensor electrode, both when the drive control unit drives the piezoelectric element in the first driving mode and when the drive control unit drives the piezoelectric element in the second driving mode.

4. The foreign substance removal apparatus according to claim 1, wherein the drive control unit is configured to apply a first voltage to the piezoelectric element when the drive control unit drives the piezoelectric element in the first driving mode and the second driving mode, wherein the drive control unit is configured to apply a second voltage to the piezoelectric element when the drive control unit drives the piezoelectric element in the third driving mode, and wherein the first voltage is lower than the second voltage.

5. The foreign substance removal apparatus according to claim 1, wherein the drive control unit is configured to drive the piezoelectric element for a first driving time when the drive control unit drives the piezoelectric element in the first driving mode and in the second driving mode, wherein the drive control unit is configured to drive the piezoelectric element for a second driving time when the drive control unit drives the piezoelectric element in the third driving mode, and wherein the first driving time is shorter than the second driving time.

6. The foreign substance removal apparatus according to claim 1, further comprising a memory configured to store the driving parameter set by the driving parameter generation unit; and a time counter unit configured to measure an elapsed time since the drive control unit drives the piezoelectric element in the third driving mode, wherein the drive control unit is configured to drive the piezoelectric element in the third driving mode with use of the driving parameter stored in the memory without causing the driving parameter generation unit to operate, in a case where the elapsed time measured by the time counter unit is within a predetermined range.

7. The foreign substance removal apparatus according to claim 1, further comprising:

a temperature detection unit configured to detect an ambient temperature around the optical member; and a memory configured to store the driving parameter set by the driving parameter generation unit in association with the temperature detected by the temperature detection unit, wherein the drive control unit is configured to drive the piezoelectric element in the third driving mode with use of the driving parameter stored in the memory without causing the driving parameter generation unit to operate, in a case where the temperature detected by the temperature detection unit when the drive control unit is caused to operate is within a predetermined range set based on the temperature stored in the memory.

8. An optical apparatus comprising:

an optical member;

a piezoelectric element attached to the optical member;

a drive control unit configured to drive the piezoelectric element in a first driving mode for exciting a first bending vibration of the optical member, a second driving mode for exciting a second bending vibration of the optical member, and a third driving mode for simultaneously exciting the first bending vibration and the second bending vibration, the second bending vibration having an order different from an order of the first bending vibration;

a vibration detection unit configured to detect a vibration of the optical member when the drive control unit drives the piezoelectric element in the first driving mode and in the second driving mode; and a driving parameter generation unit configured to determine a driving parameter for when the drive control unit drives the piezoelectric element in the third driving mode based on a time phase difference between a vibration of the optical member which is detected when the drive control unit drives the piezoelectric element in the first driving mode, and a vibration of the optical member which is detected when the drive control unit drives the piezoelectric element in the second driving mode, wherein the drive control unit is configured to drive the piezoelectric element in the third driving mode with use of the driving parameter determined by the driving parameter generation unit.

9. The optical apparatus according to claim 8, wherein a drive electrode and a sensor electrode are formed at the piezoelectric element, wherein the drive control unit is configured to drive the piezoelectric element by applying a voltage to the drive electrode, and wherein the vibration detection unit is configured to detect the vibration of the optical member from an output from the sensor electrode.

10. The optical apparatus according to claim 9, wherein the piezoelectric element includes a first piezoelectric element provided at one end of the optical member, and a second piezoelectric element provided at the other end of the optical member, wherein a first drive electrode and a first sensor electrode are formed at the first piezoelectric element, wherein a second drive electrode is formed at the second piezoelectric element, wherein the drive control unit is configured to apply voltages in a same phase to the first drive electrode and the second drive electrode, both when the drive control unit drives the first piezoelectric element and the second piezoelectric element in the first driving mode and when the drive control unit drives the first piezoelectric element and the second piezoelectric element in the second driving mode, and wherein the vibration detection unit is configured to detect the vibration of the optical member from an output of the first sensor electrode, both when the drive control unit drives the piezoelectric element in the first driving mode and when the drive control unit drives the piezoelectric element in the second driving mode.

11. The optical apparatus according to claim 8, wherein the drive control unit is configured to apply a first voltage to the piezoelectric element when the drive control unit drives the piezoelectric element in the first driving mode and the second driving mode, wherein the drive control unit is configured to apply a second voltage to the piezoelectric element when the drive control unit drives the piezoelectric element in the third driving mode, and wherein the first voltage is lower than the second voltage.

12. The optical apparatus according to claim 8, wherein the drive control unit is configured to drive the piezoelectric element for a first driving time when the drive control unit drives the piezoelectric element in the first driving mode and the second driving mode, wherein the drive control unit is configured to drive the piezoelectric element for a second driving time when the drive control unit drives the piezoelectric element in the third driving mode, and wherein the first driving time is shorter than the second driving time.

13. The optical apparatus according to claim 8, further comprising a memory configured to store the driving parameter set by the driving parameter generation unit; and a time counter unit configured to measure an elapsed time since the drive control unit drives the piezoelectric element in the third driving mode, wherein the drive control unit is configured to drive the piezoelectric element in the third driving mode with use of the driving parameter stored in the memory without causing the driving parameter generation unit to operate, in a case where the elapsed time measured by the time counter unit is within a predetermined range.

14. The optical apparatus according to claim 8, further comprising:

a temperature detection unit configured to detect an ambient temperature around the optical member; and a memory configured to store the driving parameter set by the driving parameter generation unit in association with the temperature detected by the temperature detection unit, wherein the drive control unit is configured to drive the piezoelectric element in the third driving mode with use of the driving parameter stored in the memory without causing the driving parameter generation unit to operate, in a case where the temperature detected by the temperature detection unit when the drive control unit is caused to operate is within a predetermined range set based on the temperature stored in the memory.

* * * * *